Figure 1:
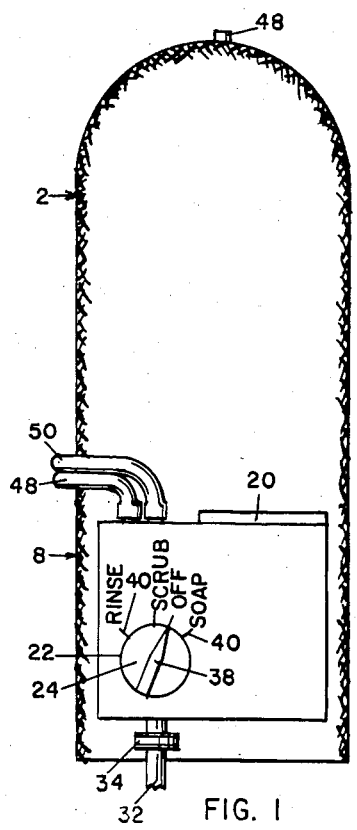

United States Patent [19]

Bayless

[11] Patent Number: 4,696,593
[45] Date of Patent: Sep. 29, 1987

[54] CAR WASHING MITT

[76] Inventor: James D. Bayless, 412 S. Bellaire, Kansas City, Mo. 64123

[21] Appl. No.: 938,455

[22] Filed: Dec. 5, 1986

[51] Int. Cl.$^4$ .................. A46B 11/06; A47K 7/03; B05C 1/00

[52] U.S. Cl. ........................................ 401/7; 401/42; 401/43; 401/176; 239/310; 15/227

[58] Field of Search ............... 401/7, 40–43, 401/45–47, 6, 8, 141, 142, 150, 176; 239/310, 311, 321; 15/227

[56] References Cited

U.S. PATENT DOCUMENTS

| | | | |
|---|---|---|---|
| 2,033,197 | 3/1936 | Kinkade | 401/150 |
| 2,538,850 | 1/1951 | Simms | 401/46 |
| 2,669,739 | 2/1954 | Winberg | 401/7 |
| 2,678,634 | 5/1954 | Henriksen | 401/142 |
| 2,790,191 | 4/1957 | Johnson | 401/7 |
| 3,039,492 | 6/1962 | Brucker | 401/40 |

Primary Examiner—Richard J. Apley
Assistant Examiner—Franklin Gubernick
Attorney, Agent, or Firm—John A. Hamilton

[57] ABSTRACT

A car washing mitt constituting a flexible glove adapted to be worn on the hand of a user, having a palm pad formed of sponge material, and a liquid soap reservoir also mounted on the glove. A flexible water hose may be connected to a control device mounted on the glove, and the control device includes a manually operable selector valve, which may be set to deliver water selectively either directly to the interior of the pad, or to the interior of the pad after intermixture thereof with soap from the reservoir, or to a jet directed forwardly from the tip of the glove for rinsing purposes.

3 Claims, 6 Drawing Figures

CAR WASHING MITT

This invention relates to new and useful improvements in car washing apparatus, and has particular reference to a specially designed glove or mitt adapted to be worn on the hand of the user and adapted to deliver water or soap, or both, to a sponge pad forming the palm of the mitt so as to be usable in scrubbing and rinsing the body of an automobile in a very simple and expeditious manner.

A particular object of the present invention is the provision of a car washing mitt including a glove adapted to be worn on the hand of a user and having a sponge-like palm, and a control box also mounted directly on the mitt, the control box including a selector valve which may be manually set to deliver either water or water mixed with a liquid detergent or soap to the sponge palm, or to deliver plain water directly forwardly in the form of a jet or stream for use in rinsing the automobile.

Another object is the provision of a car washing mitt of the character described in which a garden hose or the like may be connected directly to the control box to serve as the sole supply of water, and in which a liquid soap or the like is contained in a reservoir formed in the control box itself, whereby to eliminate any need for other supply connections to the mitt.

A further object is the provision of a car washing mitt of the character described provided with a novel pump for delivering liquid soap from the reservoir for intermixture with the water, regardless of the position in which the mitt may be disposed at any given moment, the delivery being in no way dependent on gravity flow of the soap.

Other objects are simplicity and economy of construction, and simplicity, convenience and dependability of operation.

Figure 2:
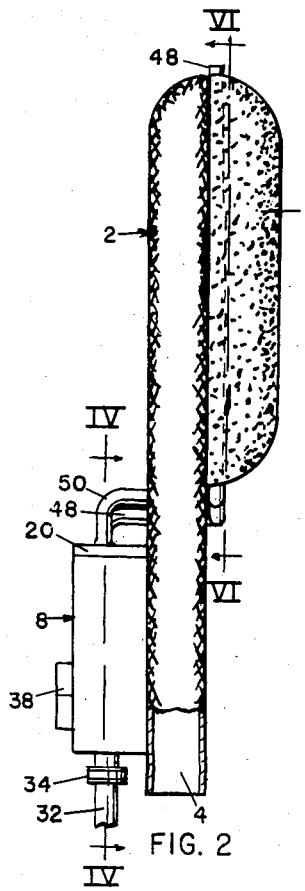
Figure 3:
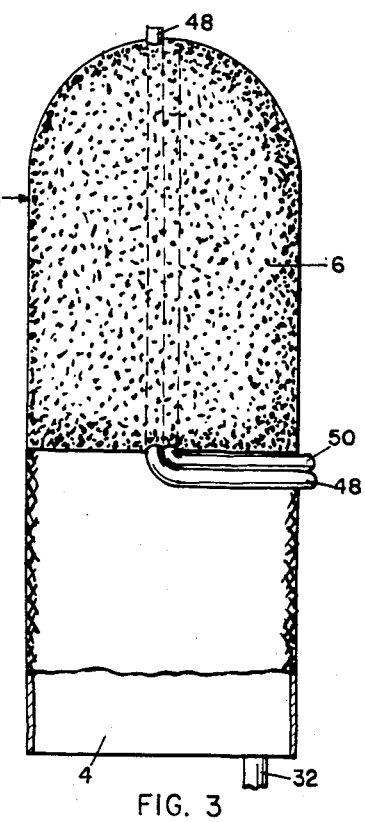
Figure 4:
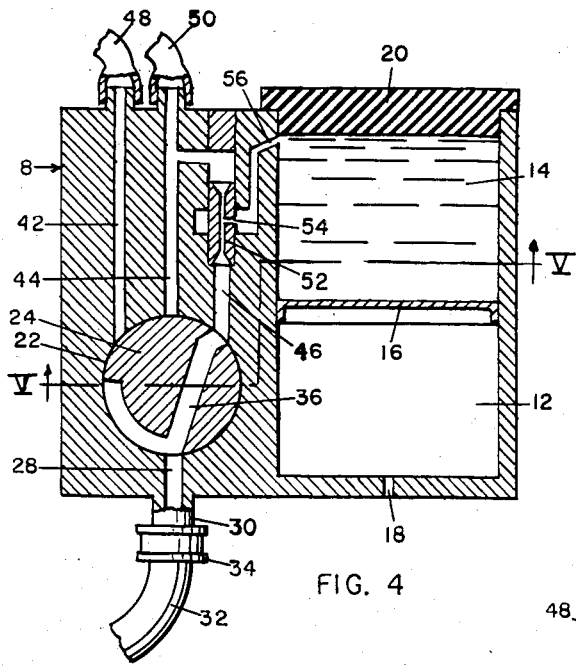
Figure 5:
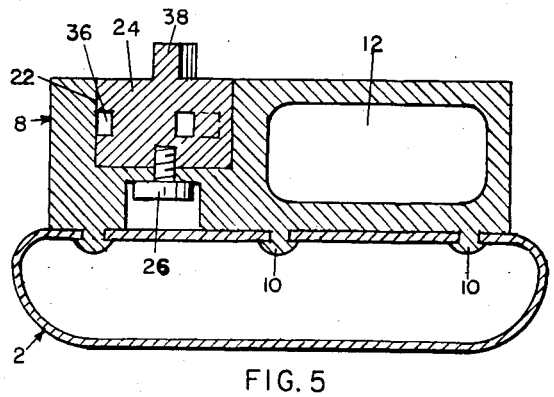
Figure 6:
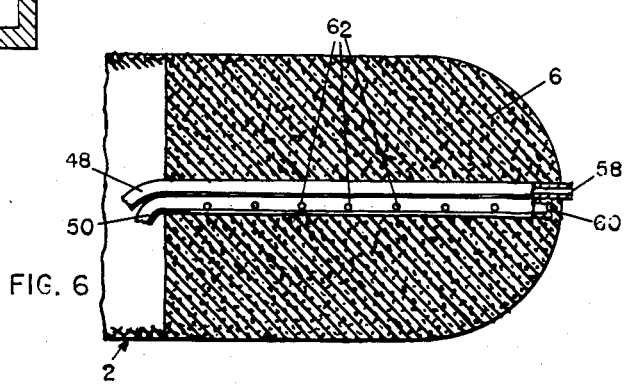

With these objects in view, as well as other objects which will appear in the course of the specification, reference will be had to the accompanying drawing, wherein:

FIG. 1 is a back elevational view of a car washing mitt embodying the present invention, FIG. 2 is a side elevational view of the mitt as shown in FIG. 1, FIG. 3 is a front elevational view of the mitt as shown in FIG. 1, FIG. 4 is an enlarged sectional view taken on line IV—IV of FIG. 2, FIG. 5 is a sectional view taken on line V—V of FIG. 4, and FIG. 6 is a fragmentary sectional view taken on line VI—VI of FIG. 2.

Like reference numerals apply to similar parts throughout the several views, and the numeral 2 applies generally to a glove forming the principal structural element of the car washing mitt of the present invention. Said glove is formed of a stout but flexible material, preferably waterproof, such as rubberized canvas or the like, being of elongated and flattened tubular form, closed at its rounded forward end, and open at its rearward end, as at 4, for the insertion of the user's hand and forearm. It is of sufficient length that when the wearer's fingers are inserted to the closed forward end thereof, its rearward end will extend beyond his wrist and upwardly along his forearm. The forward surface of the glove, in the area thereof normally covering the wearer's fingers and palm, is covered by a thick pad 6 of natural or synthetic foam of soft, sponge-like consistency. Said pad is permanently affixed to the glove as by cementing or in any other suitable manner. A control box indicated generally by the numeral 8 is affixed to the outer surface of the glove adjacent its open end, so as to be disposed at the outer side of the wearer's wrist and forearm.

Control box 8 is shown as rectilinear in form, and may be affixed to the glove in any suitable manner, such as by the integral rivets 10 shown in FIG. 5. Internally, said box is formed to present a hollow reservoir 12 for a liquid soap or detergent 14 suitable for use in washing automobiles, said reservoir being of uniform cross sectional dimensions from one end to the other to accommodate a piston 16 mounted for frictional sliding movement therein. Said reservoir is provided at one end with an atmospheric air vent 18 at one end thereof, and with a substantially air-tight rubber stopper 20 at its opposite end.

Formed in the outer surface of box 8 is a cylindrical recess 22 in which a cylindrical valve member 24 is mounted for axial rotation, said valve member being retained in said recess by an axial screw 26 based in the body of said box (see FIG. 5). The body of the box is provided with a passage 28 extending between recess 22 and an inlet neck 30 of the box, to which a garden hose 32 or the like may be attached by the usual fixture 34, to supply water for operation of the device. Valve member 24 is provided with an internal passage 36 which is interconnected with passage 28 at all usable positions of the valve. The valve member may be manually turned by means of an outward projection 38 thereof. Said projection has the form of a pointer, which may be turned by rotation of the valve member to coincide selectively with any of a series of indicia marks 40 imprinted on the outer surface of the box. The outlet end of internal passage 36 of the valve member may be interconnected selectively with any of a series of internal passages 42, 44 or 46 of the box, by rotation of said valve member. Passages 42 and 44 each open outwardly from box 8, and are interconnected respectively with a pair of flexible hoses 48 and 50. Passage 46 has an aspirator pump 52 of the Venturi type mounted therein within box 8, and is then connected back into passage 44. The pump is of the well known type in which water flowing longitudinally therethrough is confined to flow at a high rate of speed through a restricted passage, thereby creating an inward suction through a side inlet 54 thereof, said inlet opening being interconnected into reservoir 12, adjacent the stopper 20 thereof, by a passage 56 formed in the body of the box. The two hoses 48 and 50 exiting from box 8 at its forward edge are led araound the side of glove 2 and enter the rearward edge of pad 6, closely adjacent the palm of the glove, and extend to the forward end of the glove. Said hoses may be cemented or otherwise sealed in the sponge pad by any suitable means, not shown. As best shown in FIG. 6, hose 48 extends slightly forwardly of the glove, and is open at its forward end, as indicated at 58, in order to be capable of directing a stream of water forwardly. Hose 50 terminates within the pad, and is closed at its forward end as indicated at 60, but is provided, in the portion thereof within the pad, with a series of perforations 62 through which water, or water and soap, may be directed into the interior of the pad.

In operation, it will be seen that when valve pointer 38 is matched with the indicia mark 40 labelled OFF, the internal passage 36 of the valve member will be disposed between box passages 44 and 46 of the box, not registered with either, and no water will flow. When the valve is turned to match pointer 38 with the mark labelled SOAP, valve passage 36 will deliver water to passage 46, so that it flows through aspirator pump 52 to suck soap from reservoir 12 into the water flow, so that the water-soap mixture then flows to passage 44 and through hose 50 to be delivered into pad 6 through perforations 60 of said hose. When the pad has become thoroughly saturated with soap and water, the user may scrub the surface of the automobile body by moving his hand, and hence pad 6, over the car body with a scrubbing motion. Once the pad has been thoroughly saturated, it is not generally desirable to continue to apply additional soap, since to do so would tend to unduly concentrate the soap content of the scrubbing liquid to a sticky consistency, and would also be wasteful of the soap. To prevent this condition, the valve member may be turned back to the OFF position, so that all water and soap supply to the pad is halted, or to the SCRUB position, in which water is delivered directly to hose 50 through box passage 44, but no soap is delivered, since no water then passes through the aspirator pump, and no soap is sucked from the reservoir. Actually, the most efficient scrubbing action is obtained by alternating the valve between the SCRUB and SOAP positions, turning it to the SOAP position only when it becomes obvious to the user that more soap is needed, which is a readily observable condition. The continuous flow of water in the SCRUB position, even when no additional soap is added, serves to flush away any soil loosened from the car surface by the scrubbing action, and lessens any tendency for the soil to be retained between the pad and the car, whereby additional scrubbing action could cause it to scratch or abrade the car finish. Another usage of the SCRUB position of the valve is in cleaning the soap from the pad each time a usage of the device is completed. This valve setting provides a continuous supply of water, but not soap, to the pad, so that the user may alternately squeeze and release the pad by flexure of his hand to drive any water-soap mixture from the pad and replace it with water only. When the scrubbing phase of the car wash is completed, the valve is shifted to the RINSE position, whereupon water passes through box passage 42 and hose 48 to be directed from the forward end of the glove in the form of a water jet, which may be utilized to rinse soapy water from the car body. Here again, the user may conveniently direct the water jet to any part of the car body, both by bodily movement of his hand, or by flexing his hand within the glove to change the direction of the water jet.

The function of the aspirator pump 52 and piston 16, as shown, is that it provides for constant delivery of soap, whenever the control valve is set to the SOAP position, regardless of the physical position in which mitt may be disposed at any moment. As soap is sucked from the reservoir by the pump, the piston follows the soap, and is then retained in position by its frictional fit in the reservoir, so that soap is always available at the outlet passage 56 from the reservoir. The inlet passage 54 of the pump is too small for soap to flow in the absence of suction generated by the pump. The reservoir is amply large to contain an amount of soap at least sufficient for the full washing of a single car. It may be filled whenever necessary by removing stopper 20, pushing piston 16 to the opposite end of the reservoir, pouring in liquid soap, and reinserting the stopper.

While I have shown and described a specific embodiment of my invention, it will be readily apparent that many minor changes of structure and operation could be made without departing from the spirit of the invention.

What I claim as new and desire to protect by Letters Patent is:

1. A car washing mitt comprising:
   a. a glove which may be worn on the hand of a user,
   b. a control valve mounted on said glove,
   c. means whereby said control valve may be furnished with a constant supply of water under pressure,
   d. a pad of sponge material mounted on the palm of said glove,
   e. means for delivering water from said control valve to the interior of said pad,
   f. a liquid soap reservoir also mounted on said glove and comprising an elongated hollow cylinder vented to the atmosphere at one end thereof,
   g. soap-water mixing means mounted on said glove and operable by the flow of water therethrough comprising a passageway operable to receive water from said control valve and to deliver it to the interior of said pad and having a restricted portion whereby the flow of water therethrough creates a zone of sub-atmospheric pressure, said zone of sub-atmospheric pressure being interconnected to said hollow cylinder at the end thereof opposite from its atmospheric vent and
   h. A piston mounted frictionally in said hollow cylinder for movement therealong, whereby when soap is withdrawn from said hollow cylinder said piston follows to render liquid soap continuously available at said zone of sub-atmospheric pressure, regardless of the physical position of said glove, said control valve being operable to deliver water selectively either through said mixing means to said pad, or directly to said pad in by-passing relation to said mixing means, or to stop the flow of water.

2. A car washing mitt comprising;
   a. a glove which may be worn on the hand of a user,
   b. a control valve mounted on said glove,
   c. means whereby said control valve may be furnished with a constant supply of water under pressure,
   d. a pad of sponge material mounted on the palm of said glove,
   e. means for delivering water from said control valve to the interior of said pad,
   f. means operable to deliver water from said control valve to a jet operable to direct water forwardly from the tip of said glove for car rinsing purposes,
   g. a reservoir for liquid soap also mounted on said glove,
   h. mixing means mounted on said glove and operable by the flow of water therethrough from said control valve to draw soap from said reservoir, mix it with said water, and deliver the mixture to the interior of said pad, said control valve being operable to deliver water selectively to the interior of said pad, or to said mixing means and thence to the interior of said pad, or to said jet, or to stop the flow of water.

3. A car washing mitt comprising:

a. a glove formed of flexible material adapted to be worn on the hand of a user, and being of sufficient length to cover the hand and a portion of the forearm of the user,
b. a thick pad of soft sponge material mounted on and covering the palm of said glove,
c. a control box mounted on the forearm portion of said glove,
d. a liquid soap reservoir constituting a cylindrical hollow formed in said control box, said hollow being vented to atmosphere at one end and having a removable stopper closing its opposite end,
e. an aspirator pump mounted in said control box and having its side suction inlet interconnected into said hollow adjacent said stopper,
f. a piston mounted for frictional sliding movement in said hollow,
g. first and second flexible hoses interconnected to said control box and extending respectively to a perforated portion thereof within said pad, and through said pad to terminate in a jet operable to direct water forwardly, the outlet of said aspirator pump being interconnected to said first hose,
h. means whereby a flexible water hose may be connected to an inlet of said control box, and
i. a control valve mounted in said control box and manually operable to direct water from said hose selectively either to the inlet of said aspirator pump, or to said first hose, or to said second hose, or to shut off the flow of water.

* * * * *